US010325339B2

(12) United States Patent
Lee et al.

(10) Patent No.: US 10,325,339 B2
(45) Date of Patent: Jun. 18, 2019

(54) METHOD AND DEVICE FOR CAPTURING IMAGE OF TRAFFIC SIGN

(71) Applicant: QUALCOMM Incorporated, San Diego, CA (US)

(72) Inventors: Hee-Seok Lee, Guri-si (KR); Kang Kim, Seoul (KR); Duck Hoon Kim, Seoul (KR); Sungwoong Kim, Namyangju-si (KR); Seok-Soo Hong, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/138,778

(22) Filed: Apr. 26, 2016

(65) Prior Publication Data

US 2017/0308989 A1 Oct. 26, 2017

(51) Int. Cl.
*G06T 1/20* (2006.01)
*B60R 11/04* (2006.01)
(Continued)

(52) U.S. Cl.
CPC ............... *G06T 1/20* (2013.01); *B60R 11/04* (2013.01); *G06K 9/00791* (2013.01); *G06K 9/00818* (2013.01); *G06T 7/593* (2017.01); *G06T 7/60* (2013.01); *G06T 7/73* (2017.01); *G08G 1/09623* (2013.01); *H04N 5/232* (2013.01); *H04N 5/2328* (2013.01); *H04N 5/23267* (2013.01); *G06T 2207/10021* (2013.01); *G06T 2207/20076* (2013.01); *G06T 2207/30252* (2013.01)

(58) Field of Classification Search
CPC ....................................................... G06T 1/20

USPC ........................................................... 348/148
See application file for complete search history.

(56) References Cited

U.S. PATENT DOCUMENTS

| 5,196,688 A * | 3/1993 | Hesse | G01S 3/7864 |
| | | | 250/203.6 |
| 5,617,490 A * | 4/1997 | Kume | G06T 7/80 |
| | | | 382/156 |

(Continued)

FOREIGN PATENT DOCUMENTS

| EP | 1506893 A2 | 2/2005 |
| EP | 1930863 A2 | 6/2008 |
| WO | 2015048954 A1 | 4/2015 |

OTHER PUBLICATIONS

International Search Report and Written Opinion—PCT/US2017/023366—ISA/EPO—dated Jun. 1, 2017, 17 pages.

(Continued)

*Primary Examiner* — Dave Czekaj
*Assistant Examiner* — Shanika M Brumfield
(74) *Attorney, Agent, or Firm* — Toler Law Group, PC.

(57) ABSTRACT

A method for capturing an image of a traffic sign by an image sensor is disclosed. The method may include capturing, by the image sensor, at least one image including the traffic sign, wherein the image sensor is mounted in a vehicle. The method may include detecting, by a processor, the traffic sign in the at least one image. The method may also include in response to detecting the traffic sign, determining, by the processor, at least one direction of the image sensor based on the at least one image and motion of the vehicle. In addition, the method may include adjusting, by the processor, the image sensor to the at least one direction.

30 Claims, 11 Drawing Sheets

(51) Int. Cl.
*G06T 7/60* (2017.01)
*H04N 5/232* (2006.01)
*G06K 9/00* (2006.01)
*G08G 1/0962* (2006.01)
*G06T 7/73* (2017.01)
*G06T 7/593* (2017.01)

(56) References Cited

U.S. PATENT DOCUMENTS

| | | | | |
|---|---|---|---|---|
| 6,125,197 | A * | 9/2000 | Mack | G06T 7/521 |
| | | | | 382/154 |
| 6,359,647 | B1 * | 3/2002 | Sengupta | G08B 13/19608 |
| | | | | 348/154 |
| 9,073,493 | B1 * | 7/2015 | Yun | B60R 1/12 |
| 9,129,181 | B1 * | 9/2015 | Nathan | G06K 9/3241 |
| 9,718,405 | B1 * | 8/2017 | Englander | G01S 19/13 |
| 9,876,993 | B2 * | 1/2018 | Sablak | H04N 7/183 |
| 2004/0100563 | A1 * | 5/2004 | Sablak | H04N 7/183 |
| | | | | 348/211.4 |
| 2005/0237385 | A1 * | 10/2005 | Kosaka | G01B 11/00 |
| | | | | 348/42 |
| 2005/0248661 | A1 * | 11/2005 | Stanvely | G03B 17/00 |
| | | | | 348/208.99 |
| 2005/0259888 | A1 * | 11/2005 | Ozluturk | H04N 5/23248 |
| | | | | 382/260 |
| 2006/0271286 | A1 * | 11/2006 | Rosenberg | G01C 21/3647 |
| | | | | 701/431 |
| 2012/0081552 | A1 * | 4/2012 | Sablak | H04N 7/183 |
| | | | | 348/169 |
| 2012/0288138 | A1 * | 11/2012 | Zeng | G08G 1/09623 |
| | | | | 382/103 |
| 2014/0036084 | A1 * | 2/2014 | Lu | B60R 11/04 |
| | | | | 348/148 |
| 2014/0204267 | A1 * | 7/2014 | Akiba | H04N 5/2353 |
| | | | | 348/362 |
| 2014/0313335 | A1 * | 10/2014 | Koravadi | H04N 7/181 |
| | | | | 348/148 |
| 2014/0376768 | A1 * | 12/2014 | Troy | G01S 17/46 |
| | | | | 382/103 |
| 2015/0215588 | A1 | 7/2015 | Schofield et al. | |
| 2015/0371097 | A1 * | 12/2015 | Park | G06K 9/00818 |
| | | | | 382/104 |
| 2017/0151883 | A1 * | 6/2017 | Bae | B60L 11/1835 |

OTHER PUBLICATIONS

Ruta, A. et al., "In-Vehicle Camera Traffic Sign Detection and Recognition", Machine Vision and Applications, Springer, Berlin, DE, vol. 22, No. 2, Dec. 3, 2009 (Dec. 3, 2009), XP019880788, pp. 359-375.

* cited by examiner

METHOD AND DEVICE FOR CAPTURING IMAGE OF TRAFFIC SIGN

FIELD OF THE DISCLOSURE

The present disclosure relates generally to capturing an image with an image sensor, and more specifically, to capturing an image of a traffic sign with an image sensor in a vehicle.

DESCRIPTION OF RELATED ART

In recent years, the use of image sensors has become popular in vehicles such as cars, trucks, unmanned aerial vehicles (UAVs), and the like. For example, vehicles are often equipped with electronic devices such as security cameras, dash cams, black boxes, webcams, or the like to record images or video of scenes. Such recorded images or video may be useful in recreating an event or scene of interest.

Image sensors are also used in autonomous or self-driving vehicles. Such vehicles are often equipped with one or more image sensors to capture scenes. From the captured scenes, objects in the captured scenes may be detected and recognized to assist in navigation.

However, scenes of images captured by image sensors of vehicles are often blurred and are thus of low quality. For example, images of stationary objects captured by an image sensor in such a vehicle may be blurred due to the movement of the vehicle. When the blurred objects in images are traffic signs, the images may not be of sufficient quality to allow detection and recognition of such signs to assist an autonomous vehicle or an inattentive driver of a vehicle in navigating through the scenes.

In conventional methods, blurred images have typically been deblurred using an image processing scheme to enhance the images including the blurred portions. However, such an image processing scheme is generally performed on the images as a post-processing method, which may require substantial computing time and resources. Further, the quality of the enhanced images based on such deblurring methods may not be sufficiently accurate or reliable, particularly when the blurring is severe.

SUMMARY OF THE INVENTION

The present disclosure provides a method for capturing an image of a traffic sign and adjusting the image sensor to track the traffic sign.

According to one aspect of the present disclosure, a method for capturing an image of a traffic sign by and image sensor is disclosed. The method may include capturing, by the image sensor, at least one image including the traffic sign, wherein the image sensor is mounted in a vehicle. The method may include detecting, by a processor, the traffic sign in the at least one image. In addition, in response to detecting the traffic sign, the method may include determining, by the processor, at least one direction of the image sensor based on the at least one image and motion of the vehicle. Further, the method may include adjusting, by the processor, the image sensor to the at least one direction. By adjusting the image sensor to the at least one direction, motion blur associated with the motion of the vehicle relative to the traffic sign may be reduced. The disclosure also describes an electronic device and a computer-readable medium relating to this method.

According to another aspect of the present disclosure, an electronic device in a vehicle for capturing an image of a traffic sign is disclosed. The electronic device may include an image sensor configured to capture at least one image including the traffic sign. The electronic device may also include a traffic sign detection unit configured to detect the traffic sign in the at least one image. In addition, the electronic device may include a rotation determination unit configured to determine, in response to detecting the traffic sign, at least one direction of the image sensor based on the at least one image and motion of the vehicle. Further, the electronic device may include a motor control unit configured to adjust the image sensor to the at least one direction. By adjusting the image sensor to the at least one direction, motion blur associated with the motion of the vehicle relative to the traffic sign may be reduced.

BRIEF DESCRIPTION OF THE DRAWINGS

Embodiments of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
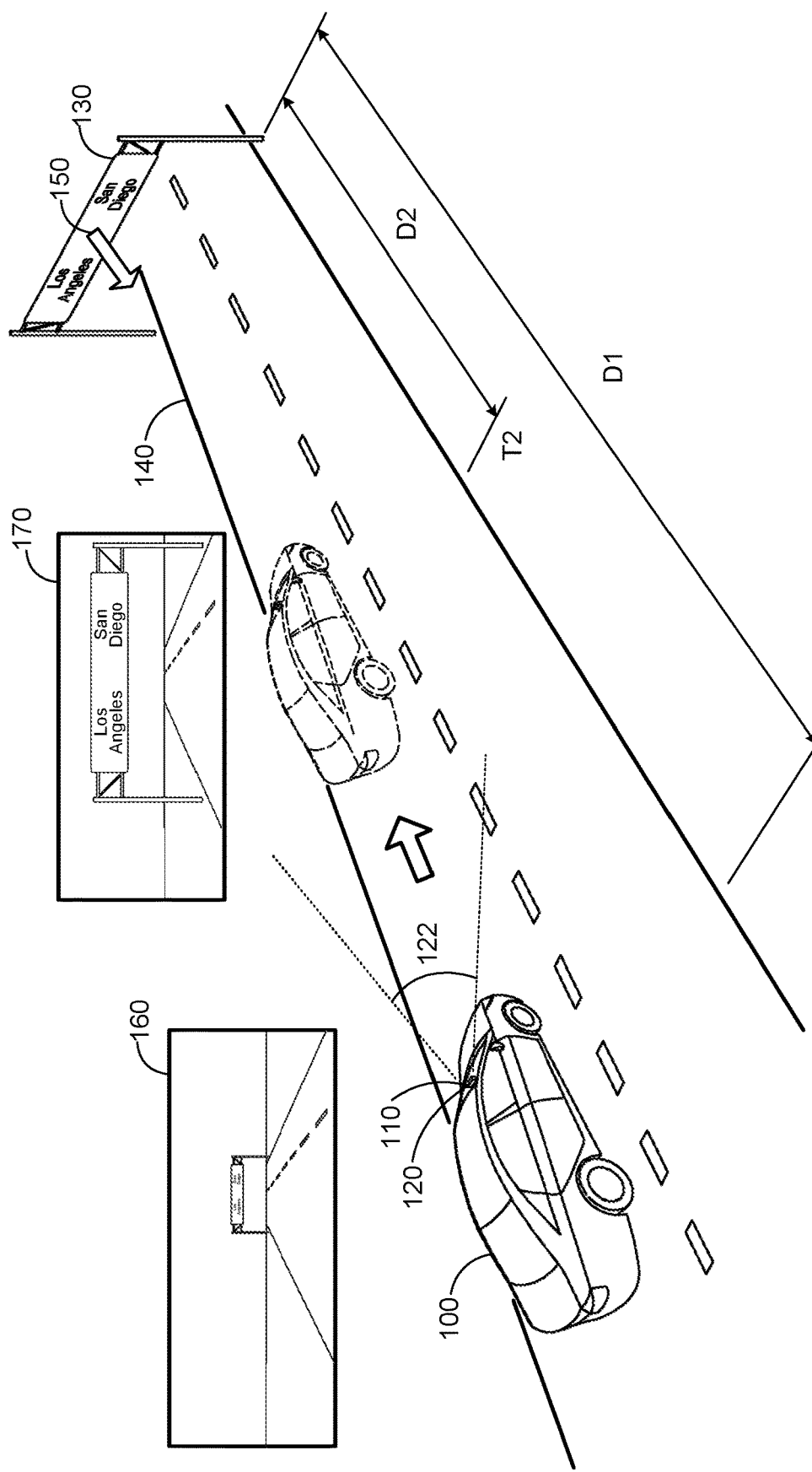
FIG. 1 illustrates a vehicle equipped with an electronic device configured adjust an image sensor for capturing an image of a traffic sign, according to one embodiment of the present disclosure.

FIG. 1 illustrates a vehicle 100 equipped with an electronic device 110 configured to adjust an image sensor 120 for capturing an image 170 of a traffic sign 130, according to one embodiment of the present disclosure. The vehicle 100 may be traveling on a road 140 leading toward the traffic sign 130 and the electronic device 110 may control the image sensor 120 to capture at least one image 160 of the road 140 including the traffic sign 130 within a view 122 of the image sensor 120. As used herein, the term "view" of an image sensor may refer to a field of view or an angle of view of the image sensor and may include a view of a scene in front of a vehicle as seen through a windshield of the vehicle, from a top portion of the vehicle, or any suitable location within or outside of the vehicle. The term "traffic sign" may refer to any sign that includes or indicates information, an instruction, or a warning for driving a vehicle and may indicate status, a condition, a direction, or the like that relates to a road or vehicle traffic.

Upon capturing the at least one image 160, the electronic device 110 may detect the traffic sign 130 in the at least one image 160. In response to detecting the traffic sign 130, a direction (e.g., yaw, pitch, and roll) of the image sensor 120 may be determined based on the at least one image 160 and motion of the vehicle 100. The electronic device 110 may then adjust the image sensor 120 to the determined direction and capture the image 170 of the traffic sign 130. Although the traffic sign 130 is described herein, it should be appreciated that the electronic device 110 and the image sensor 120 may be used to detect any suitable traffic signs based on a database of predetermined or known traffic signs.

The image sensor 120 may be disposed, mounted, or included in any location of the vehicle 100 suitable for capturing images ahead or in front of the vehicle 100. The image sensor 120 may be adjusted or rotated in at least one direction (e.g., yaw, pitch, and roll) in response to one or more control signals from the electronic device 110. Although the image sensor 120 of the electronic device 110 is illustrated as a single image sensor in FIG. 1, the image sensor 120 may include any suitable number of image sensors. For example, two or more image sensors may be used to provide stereoscopic images ahead or in front of the vehicle 100.

In FIG. 1, while the vehicle 100 is traveling or being driven on the road 140, the image sensor 120 of the electronic device 110 may continuously, periodically, or aperiodically capture images of the road 140 in front of the vehicle 100 including the traffic sign 130. In the illustrated embodiment, the image sensor 120 may initially capture, at time T1 the image 160 of the road 140 including the traffic sign 130. From the image 160, the electronic device 110 may detect a plurality of regions in the image 160 that corresponds to the objects in the image 160 including the traffic sign 130 and extract features of detected regions. The region that corresponds to the traffic sign 130 may then be detected as a traffic sign by comparing the extracted features of the regions with features of predetermined traffic signs.

Figure 2:
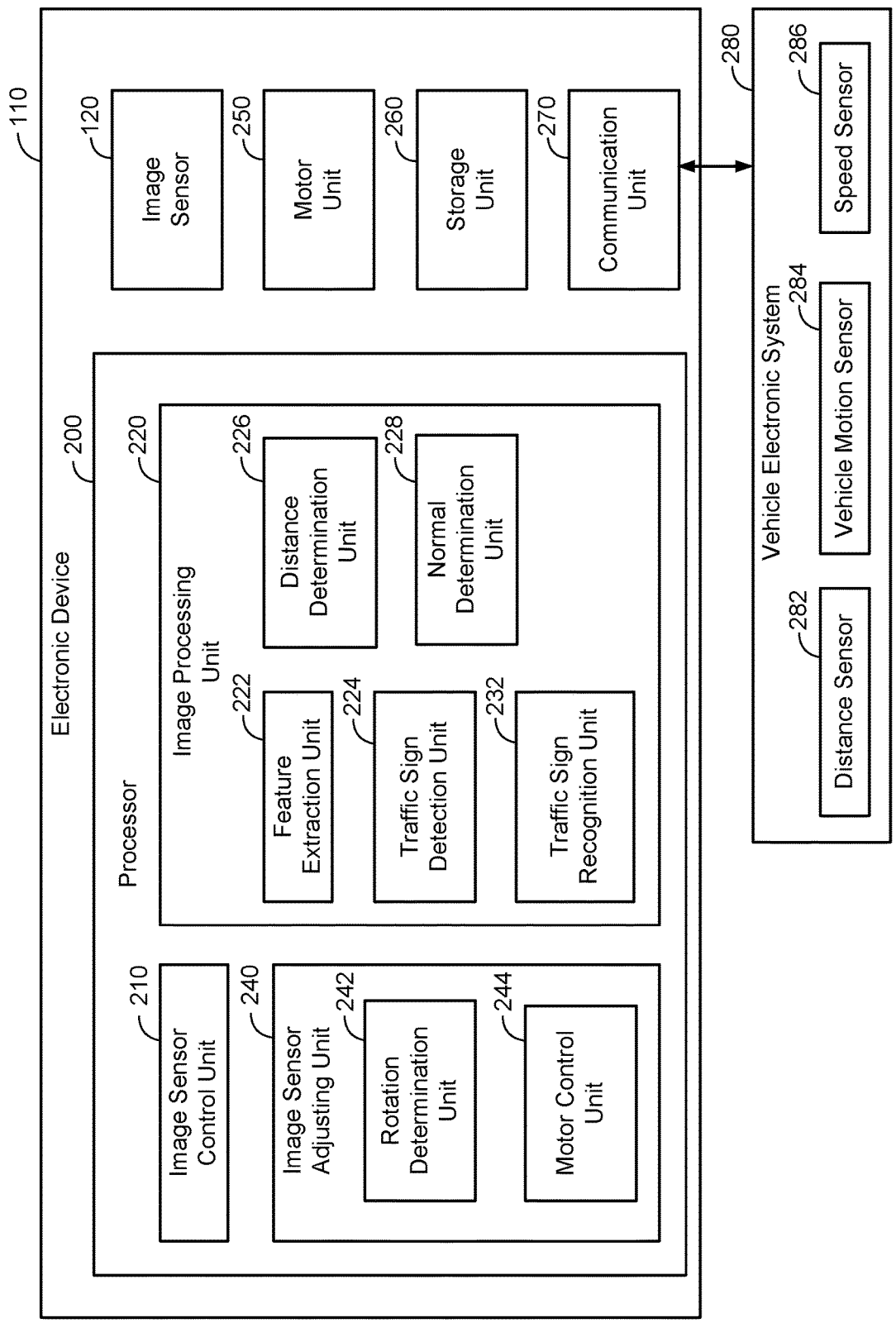
FIG. 2 illustrates a more detailed block diagram of the electronic device configured to capture an image of the traffic sign according to one embodiment of the present disclosure.

Upon detecting the traffic sign 130, the electronic device 110 may determine a distance D1 between the traffic sign 130 and the image sensor 120 or vehicle 100 based on the image 160 and distance information at time T1, a direction 150 normal to a surface of the traffic sign 130 in the image 160, and motion of the vehicle 100 (e.g., speed, rotation, translation, acceleration, or the like) from a vehicle electronic system as shown in FIG. 2. The distance information may be available by a distance sensor (shown in FIG. 2). In another embodiment, the image sensor 120 may be a stereoscopic image sensor, which may include two or more image sensors configured to capture the image 160 as a stereoscopic image. In this case, the distance D1 may be determined from the stereoscopic image 160. Alternatively, the image sensor 120 may capture another image (e.g., a second image) including the traffic sign 130 after time T1 and the electronic device 110 may detect a region in the second image associated with the traffic sign 130 as a traffic sign. In this case, the distance D1 and/or the distance of the image sensor 120 at which the second image is captured may be determined based on the image 160 and the second image.

Based on the distance D1, normal direction, and motion of the vehicle, the electronic device 110 may determine at least one direction to which the image sensor 120 is to be adjusted or rotated. In one embodiment, the electronic device 110 may then adjust or rotate the image sensor 120, for instance via a motor unit shown in FIG. 2, to the at least one direction and control the image sensor 120 to capture at least one image, which may include a plurality of images including the image 170, for a specified period of time. For example, a plurality of images may be captured after a time the image sensor 120 starts to adjust and until a specified time after the image sensor 120 is adjusted to the at least one direction. The electronic device 110 may then select one of the images (e.g., the image 170) that exhibits the least amount of blurring or a minimum level of blurring.

In another embodiment, the electronic device 110 may determine the at least one direction of the image sensor 120 at a distance D2 and/or time T2 at which the next image 120 is to be captured based on the motion of the vehicle 100 and adjust the image sensor 120 to the at least one direction via the motor unit shown in FIG. 2. Additionally or alternatively, the electronic device 110 may determine at least one direction of the image sensor 120 at each of a plurality of distances (e.g., D2) between the image sensor 120 and the traffic sign 130 and/or at each of a plurality of points in time (e.g., T2) based on one or more images (e.g., the image 160) and the motion of the vehicle 100. The directions of the image sensor 120 may then be determined and adjusted for a plurality of distances and/or a plurality of points in time based on a change in the motion of the vehicle 100 including a change in speed and/or direction of the vehicle 100.

By adjusting the image sensor 120 as described herein, the image sensor 120 may track the traffic sign 130 to compensate for the motion of the vehicle at time T1. During the time between T1 and T2, at which time the vehicle 100 reaches the distance D2 to the traffic sign 130, the electronic device 110 may adjust the image sensor 120 to the at least one direction and capture the image 170 at the distance D2 and/or time T2. By thus tracking the traffic sign 130, the traffic sign 130 in the image 170 captured by the image sensor 120 may exhibit a reduced or minimized blurring effect, which may result from the motion of the vehicle 100.

FIG. 2 illustrates a more detailed block diagram of the electronic device 110 configured to capture an image of the traffic sign 130 by the image sensor 120 and adjust the image sensor 120 to track the traffic sign 130, according to one embodiment of the present disclosure. The electronic device 110 may include the image sensor 120, a processor 200, a motor unit 250, a storage unit 260, and a communication unit 270. The electronic device 110 may be configured to communicate with a vehicle electronic system 280 via the communication unit 270. In one embodiment, the electronic device 110 may be electronically coupled via the communication unit 270 to a vehicle electronic system 280 of the vehicle 100 over one or more communication lines. Alternatively, the communication unit 270 may allow wireless communication between the electronic device 110 and the vehicle electronic system 280 by employing any suitable wireless communication scheme such as Wi-Fi, WiMAX, Bluetooth, or any other wireless communication technologies (e.g., 4G, 5G, etc.) capable of wirelessly transmitting or receiving data.

In some embodiments, the vehicle electronic system 280 may be any suitable electronic system of the vehicle configured to monitor conditions and/or operation of one or more parts or units of the vehicle 100. Although the vehicle electronic system 280 and the electronic device 110 are illustrated as separate units, the electronic device 110 may be included as a part of the vehicle electronic system 280. The vehicle electronic system 280 may include a distance sensor 282, a vehicle motion sensor 284, and a speed sensor 286. The distance sensor 282 may be located or mounted in any suitable location of the vehicle 100 and may be configured to detect a distance between the distance sensor 282 and a target object (e.g., the traffic sign 130) that may be approximated as a distance between the image sensor 120 and the traffic sign 130. The distance sensor 282 may be any suitable sensors capable of detecting a distance such as a radar sensor, an ultrasonic sensor, or a laser sensor. The vehicle motion sensor 284 may be configured to detect translation and rotation of the vehicle 100 while the speed sensor 286 may be configured to detect speed of the vehicle 100 using any suitable speed detection schemes including GPS tracking or a speedometer provided in the vehicle 100.

The vehicle motion sensor 284 may detect translation and rotation of the vehicle 100 using any suitable methods adapted to monitor, sense, detect, or measure movement of the vehicle 100. For example, the vehicle motion sensor 284 may include a steering sensor configured to detect translation and rotation of the vehicle 100 based on an amount and direction of the rotation of the steering wheel. Additionally or alternatively, the vehicle motion sensor 284 may include a wheel encoder or a wheel speed sensor configured to determine translation and rotation of the vehicle 100 by detecting amounts of rotation of the wheels in the vehicle 100. In this case, the rotation amounts of right and left wheels may be compared to determine the translation and rotation (e.g., a translation direction and a rotation direction) of the vehicle 100. The vehicle motion sensor 284 may also include a gyro sensor configured to detect rotation of the vehicle 100. The vehicle motion sensor 284 may further include a global positioning system (GPS) configured to detect translation of the vehicle 100. In some embodiments, the vehicle electronic system 280 may generate translation and rotation data (e.g., a translation vector or direction, a rotation vector or direction, or the like) from the detected translation and rotation of the vehicle 100. The vehicle electronic system 280 may provide the electronic device 110 with information associated with or indicative of motion of the vehicle 100 including distance information (e.g., one or more distances, a depth map, etc.), speed, and translation and rotation data to the electronic device 110 on a real time basis.

The processor 200 may include an image sensor control unit 210, an image processing unit 220, and an image sensor adjusting unit 240. The image sensor control unit 210 may be configured to control the image sensor 120 to continuously, periodically, or aperiodically capture images of a road such as the road 140 including the traffic sign 130 within a view 122 of the image sensor 120. As described herein, the term "image sensor" may refer to any suitable image sensing device that can sense, detect, capture, or acquire one or more images of objects or scenes and may include at least one lens and a sensor such as a CMOS sensor, a charge coupled device (CCD), or the like. For example, the image sensor 120 may be a digital camera, a camcorder, a video camera or the like. The processor 200 may be any suitable processor, processing unit, or circuitry capable of managing and/or operating the electronic device 110, such as an application processor (AP), central processing unit (CPU), digital signal processor (DSP), etc. As used herein, the term "unit" may refer to one or more hardware components, sections, parts, or circuitry capable of performing or adapted to perform one or more functions and may additionally perform such functions in conjunction with or by executing processes, instructions, procedures, subroutines, or the like (e.g., program code, microcode, etc.). In turn, a "unit" may be segmented into smaller units (e.g., sub-units) or two or more units may be combined into a larger "unit."

The image sensor control unit 210 may control the image sensor 120 to capture images based on image sensor parameters (e.g., a focal length, aperture, and the like) associated with the image sensor 120. As used herein, the term "image sensor parameters" may refer to any parameters associated with an image sensor that may describe or indicate one or more operating conditions of an image sensor and may include a focal length, image sensor format, principal point (e.g., a center point in an image), a skew coefficient between an x-axis and a y-axis of an image, ISO, exposure time, shutter speed, aperture, an angle of view of the image sensor, an image capture rate of image frames, and/or the like.

In some embodiments, the image sensor 120 may initially capture the image 160 of the road 140 including the traffic sign 130 while the vehicle 100 is traveling on the road 140. The captured image 160 may then be provided to the image processing unit 220 of the processor 200. The image processing unit 220 may include a feature extraction unit 222, a traffic sign detection unit 224, a distance determination unit 226, a normal determination unit 228, and a traffic sign recognition unit 232. The feature extraction unit 222 may receive the captured image 160 and extract features of a plurality of objects in the image 160. In one embodiment, the objects in the image 160 may be detected by segmenting the image 160 into a plurality of regions based on a shape, a color, and/or a location associated with the objects in the image 160 using any suitable image segmentation scheme such as a histogram-based method, an edge detection method, a region-growing method, a split and merge method, a multi-scale method, or the like. The feature extraction unit 222 may then extract features from each of the segmented regions associated with the objects in the image and provide the features to the traffic sign detection unit 224. In one embodiment, the features extracted from each of the regions associated with the objects may be represented as a plurality of feature values (e.g. a feature vector).

Upon receiving the extracted features of the segmented objects in the image 160, the traffic sign detection unit 224 may access a database of features of known or predetermined traffic signs and compare the extracted features of the objects with the features in the database. In one embodiment, the database of the plurality of traffic signs may be stored in the storage unit 260 of the electronic device 110 for access by the traffic sign detection unit 224. The storage unit 260 may also store the image sensor parameters associated with the image sensor 120 and the information indicative of motion of the vehicle 100 received from the vehicle electronic system 280. The storage unit 260 may be a local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive). Additionally or alternatively, the database of the traffic signs may be stored in the vehicle electronic system 280 or an external device (e.g., a server) and may be accessed by the traffic sign detection unit 224 for use in detecting a traffic sign in an image.

Based on the comparison of the features, the traffic sign detection unit 224 may determine that features of a traffic sign in the database matches or most closely matches the features of the segmented object corresponding to the traffic sign 130. Accordingly, the object or the segmented region corresponding to the traffic sign 130 in the image 160 may be detected as a traffic sign. Upon detecting the traffic sign 130 in the image, the feature extraction unit 222 may transmit coordinates of the segmented region corresponding to the traffic sign 130 in the image 160 to the distance determination unit 226 and the normal determination unit 228.

As the coordinates of the segmented region associated with the traffic sign 130 are received, the distance determination unit 226 may process the image 160 to determine a distance between the image sensor 120 and the segmented region associated with the traffic sign 130 in the image 160. The distance information may then be provided to the image sensor adjusting unit 240. In one embodiment, the distance sensor 282 in the vehicle electronic system 280 may generate a two-dimensional depth map of a scene in front of the vehicle at time T1 when the image 160 is captured. The depth map may include information on distances to a plurality of objects of the scene. The distance determination unit 226 may receive the depth map from the distance sensor 282 via the communication unit 270 and determine a portion of the depth map that corresponds to the coordinates of the segmented region associated with the traffic sign 130. The depth or distance information for the traffic sign 130 may then be obtained from the portion of the depth map that corresponds to the traffic sign 130. In some embodiments, the distance sensor 282 may be any suitable distance or range sensor adapted to sense or detect distance of objects and may include a radar sensor, ultrasonic sensor, a laser sensor, or the like.

In another embodiment, the image sensor 120 may include a plurality of image sensors arranged to capture a plurality of images in front of the vehicle 100. For example, the image sensor 120 may be a stereoscopic image sensor, which may include two or more image sensors configured to capture the image 160 as a stereoscopic image. Since depth information can be determined from such a stereoscopic image, the distance D1 to the traffic sign 130 may be determined from the stereoscopic image after determining the coordinates of the region in the stereoscopic image that corresponds to the traffic sign 130.

In an alternative embodiment, the image processing unit 220 may determine the distance D1 based on the image 160 and another image (e.g., a second image) that include the traffic sign 130. In this case, the image processing unit 220 may transmit a signal to instruct the image sensor control unit 210 to capture the second image, which may be used to determine the distance D1 together with the image 160. In response to receiving the signal, the image sensor control unit 210 may control the image sensor 120 to capture the second image, which may be processed by the feature extraction unit 222 and the traffic sign detection unit 224 to determine the coordinates of the traffic sign 130 in the second image. Based on the coordinates of the traffic sign 130 in the image 160 and the second image as well as the information indicative of motion of the vehicle (e.g., speed, direction, or the like), the distance determination unit 226 may determine the distance D1 at which the image 160 was captured and/or the distance at which the second image was captured.

The normal determination unit 228 may receive the coordinates of the segmented region corresponding to the traffic sign 130 in the image 160 from the traffic sign detection unit 224. Upon receiving the coordinates of the segmented region, the normal determination unit 228 may process the image 160 including the traffic sign 130 to determine the direction 150 normal to a surface of the traffic sign 130. As used herein, the term "normal" or "normal direction" means a direction or vector that is perpendicular to a surface of an object such as a traffic sign. In some embodiments, the normal direction 150 of the traffic sign 130 may be determined based on the image 160. In one embodiment, the normal direction 150 of the traffic sign 130 may be determined to be a direction of the road 140 in the image 160 since a normal to the surface of the traffic sign 130 can be generalized or assumed to be parallel to a direction or shape of the road 140. For example, the normal determination unit 228 may determine the direction of the road 140 based on GPS information received from the vehicle electronic system 280 and/or a database of roads. In another embodiment, the image sensor 120 may be a stereoscopic image sensor such that the image 160 may be a stereoscopic image, which may provide depth information for objects in the image. In this case, the normal direction 150 of the traffic sign 130 may be determined based on information relating to a shape and depth of the traffic sign 130 in the stereoscopic image 160. In an alternative embodiment, the image sensor 120 may capture another image (e.g., a second image) including the traffic sign 130 after time T1 and the electronic device 110 may detect a change in the shape and/or size of a segmented region associated with the traffic sign 130 between the image 160 and the second image and determine the normal direction 150 of the traffic sign 130 based on the change in the shape and/or size. The normal determination unit 228 may then provide the normal direction 150 (e.g., information describing or indicative of the normal direction 150) to the image sensor adjusting unit 240.

The image sensor adjusting unit 240 may include a rotation determination unit 242 and a motor control unit 244. The rotation determination unit 242 is configured to receive the normal direction 150 of the traffic sign 130, the distance between the image sensor 120 and the traffic sign 130, the information indicative of the motion of the vehicle 100. The rotation determination unit 242 may determine at least one direction to which the image sensor 120 is to be adjusted or rotated based on the received information. In one embodiment, the at least one direction may be determined as a single direction defined by a three-dimensional coordinate system (e.g., an x, y, and z coordinate system, a spherical coordinate system, or the like) or as one or more directions or angles of rotation about the x, y, and z axis (e.g., yaw, pitch, and roll). Upon determining the at least one direction for adjusting the image sensor 120, the rotation determination unit 242 may provide information for the at least one direction to the motor control unit 244.

Upon receiving the information for the at least one direction, the motor control unit 244 may control the motor unit 250, which may be operatively coupled to drive the image sensor 120, to adjust or rotate the image sensor 120 to the at least one direction. In some embodiments, the motor control unit 244 may generate one or more control signals to rotate the image sensor 120 via the motor control unit 244. In one embodiment, the motor control unit 244 may generate one or more control signals to the motor unit 250 to adjust or rotate the image sensor 120 from a current position of the image sensor 120 to the at least one direction. In this case, the current position of the motor unit 250 may be monitored by the motor control unit 244. When the at least one direction for adjusting the image sensor 120 is received from the rotation determination unit 242, the motor control unit 244 may determine an amount or degree of rotation needed to change the direction of the image sensor 120 from the current direction to the at least one direction in a 3D coordinate system (e.g., an x, y, z coordinate system, a spherical coordinate system, etc.). The motor control unit 244 may then provide the one or more control signals to the motor unit 250, which may adjust or rotate the image sensor 120 to the at least one direction based on the control signals.

According to another embodiment, the motor control unit 244 may generate one or more control signals to adjust the image sensor 120 to a reference direction, which may be a default direction of the image sensor 120 (e.g., a default direction of the view direction for the image sensor), and provide the signals to the motor unit 250. In response to the control signals, the motor unit 250 may adjust or rotate the image sensor 120 to the predetermined direction. Further, the motor control unit 244 may generate one or more control signals to adjust the image sensor 120 to the at least one direction and provide the control signals to the motor unit 250. In response to the control signals, the motor unit 250 may adjust the image sensor 120 to the at least one direction.

The rotation determination unit 242 may also generate an image capture signal, which may be provided to the image sensor control unit 210, to capture one or more images. For example, as the control signals are provided to the motor control unit 244 to adjust the image sensor 120, the rotation determination unit 242 may output the image capture signal to the image sensor control unit 210, which may control the image sensor 120 to capture one or more images. In one embodiment, the image sensor control unit 210 may control the image sensor 120 to capture a plurality of images for a specified period, which may exceed the time for the image sensor 120 to adjust or rotate to the at least one direction. Alternatively, the image sensor control unit 210 may control the image sensor 120 to capture an image (e.g., the image 170) synchronously with the adjustment or rotation of the image sensor 120 to the at least one direction. By adjusting one or more directions of the image sensor 120, images (e.g., image 170) captured by the image sensor 120 may exhibit a reduced or minimal blurring effect for the traffic sign 130 that may result from the motion of the vehicle 100.

Once the image sensor 120 captures one or more images with reduced or minimal blurring, the motor control unit 244 may provide one or more signals to the motor unit 250 to adjust the image sensor 120 back to a default direction from the adjusted direction. For example, the default direction may be a direction adapted to capture a front view of the vehicle 100. The electronic device 110 may then proceed to capture an image of a road that includes another traffic sign.

As one or more images with reduced or minimal blurring are captured, the traffic sign recognition unit 232 in the image processing unit 220 may receive the images to recognize the images including the traffic sign 130. The traffic sign recognition unit 232 may recognize the contents of the images including the traffic sign 130 using any suitable recognition schemes such as an image recognition method, an object recognition method, a character recognition method, and the like. Since the blurring effect in the images are reduced or minimized, the electronic device 110 may process the images more accurately with a reduced processing time and resources that may otherwise be required for images without a reduced or minimized blurring effect.

Figure 3:
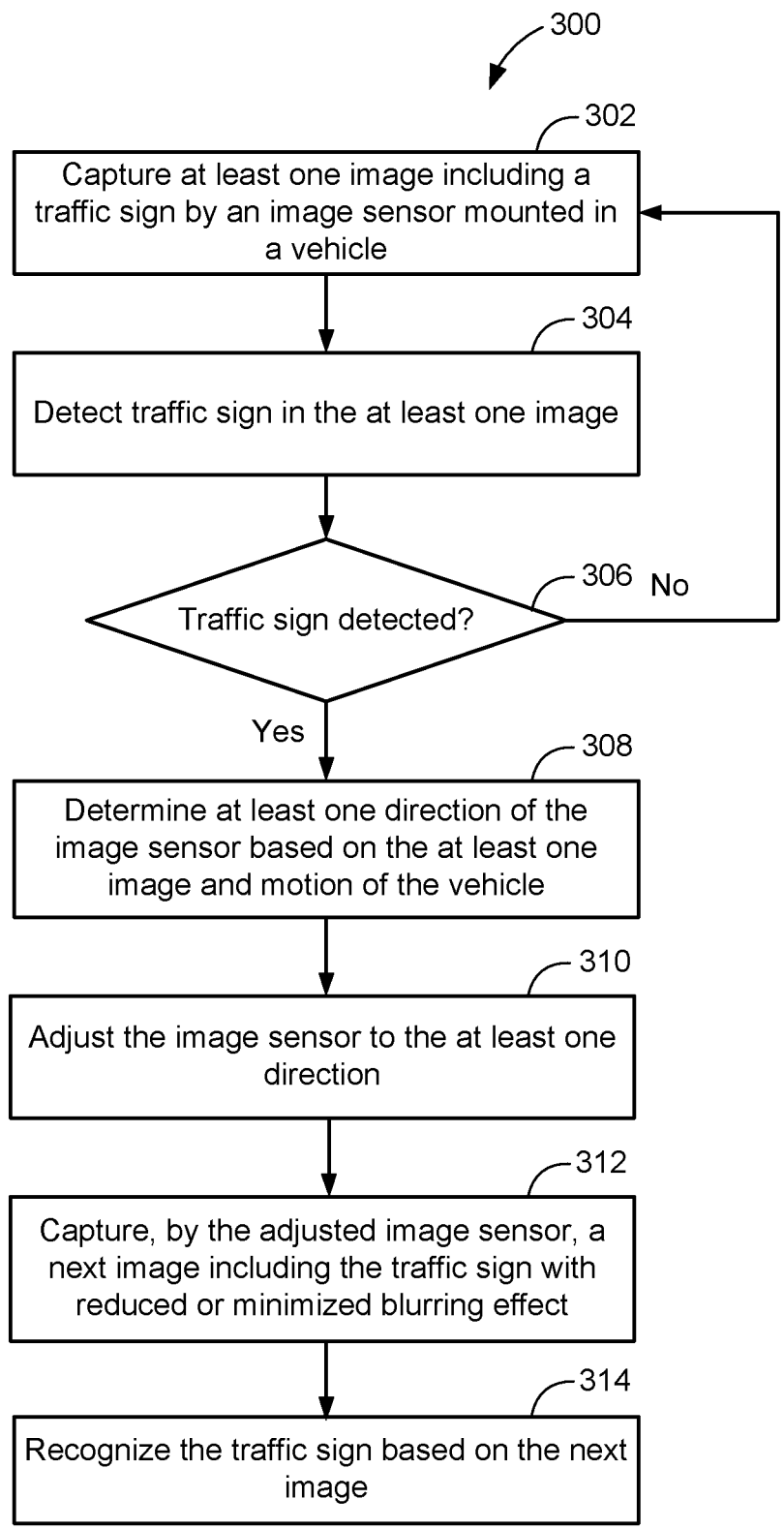
FIG. 3 illustrates an exemplary flow chart of a method to adjust the image sensor, according to one embodiment of the present disclosure.

FIG. 3 illustrates a flow chart of a method 300 performed by the electronic device 110 in the vehicle 100 to adjust the image sensor 120 to track the traffic sign 130, according to one embodiment of the present disclosure. Initially, while the vehicle 100 is traveling on the road 140, an image sensor 120 of the electronic device 110 may, at 302, capture at least one image of the road 140 including the traffic sign 130. At 304, the electronic device 110 may detect the traffic sign 130 in the at least one image by comparing the features extracted from the image 160 with the plurality of predetermined features of traffic signs accessed from a database. At 306, the electronic device 110 may determine whether a traffic sign is detected in the at least one image based on the comparison results. If a traffic sign is not detected, the method 300 proceeds back to 302 where the electronic device 110 may capture one or more images of a road via the image sensor 120.

On the other hand, if a traffic sign is detected, the electronic device 110 determines, at 308, at least one direction of the image sensor 120 based on the at least one image and the information associated with or indicative of motion of the vehicle. At 310, the electronic device 110 may adjust the image sensor 120 to the at least one direction. In one embodiment, the image sensor 120 may be adjusted or rotated in at least one direction (e.g., yaw, pitch, and roll) in response to one or more control signals from the electronic device 110. The image sensor 120 may capture at least one next image (e.g., the image 170) of the road 140 including the traffic sign 130 with a reduced or minimized blurring effect at 312. In one embodiment, the image sensor 120 may capture at least one next image while the image sensor 120 is being adjusted and/or after the image sensor 120 is adjusted to the at least one direction. Upon capturing the at least one next image of the traffic sign 130, the electronic device 110 may recognize the content of the image including the traffic sign 130 at 314.

Figure 4:
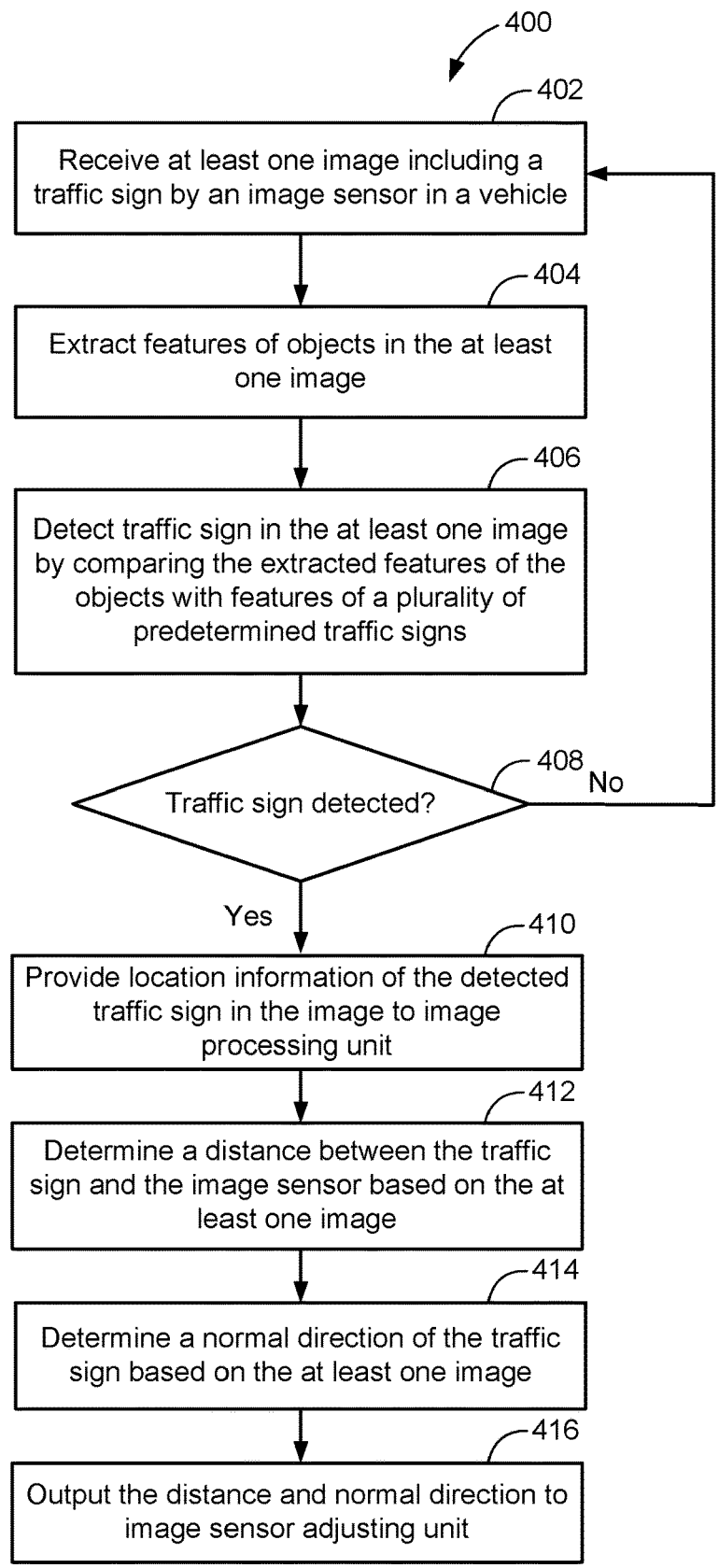
FIG. 4 illustrates an exemplary flow chart of a method to obtain a distance to the traffic sign and a normal direction of the traffic sign, according to one embodiment of the present disclosure.

FIG. 4 illustrates a flow chart of a method 400 performed by the image processing unit 220 of the electronic device 110 to obtain a distance to the traffic sign 130 and a normal direction of the traffic sign 130, according to one embodiment of the present disclosure. At 402, the feature extraction unit 222 may receive at least one image including the traffic sign 130 captured by the image sensor 120 in the vehicle 100. At 404, the feature extraction unit 222 may extract features of objects in the at least one image. In one embodiment, the objects in the image 160 may be segmented into a plurality of regions based on a shape, a color, and/or a location associated with the objects in the image 160 using any suitable image segmentation scheme. The feature extraction unit 222 may then extract features from each of the segmented regions associated with the objects in the image and provide the features to a traffic sign detection unit 224. At 406, the traffic sign detection unit 224 may determine whether a traffic sign is detected in the at least one image by comparing the extracted features of the segmented region associated with the traffic sign 130 and features of a plurality of predetermined traffic signs. If a traffic sign is not detected at 408, the method 400 proceeds back to 402 where the feature extraction unit 222 may receive one or more images of a road.

On the other hand, if a traffic sign is detected at 408, the traffic sign detection unit 224 may provide, at 410, location information (e.g., a plurality of coordinates in a coordinate system) of the detected traffic sign 130 in the image to the distance determination unit 226 and the normal determination unit 228. At 412, the distance determination unit 226 may determine a distance between the traffic sign 130 and the image sensor 120 based on each of the at least one image. At 414, the normal determination unit 228 may determine a normal direction of the detected traffic sign 130 based on the at least one image. Upon determining the distance between the traffic sign 130 and the image sensor 120 and the normal direction of the traffic sign 130, the image processing unit 220 may output the distance and normal direction to the image sensor adjusting unit 240 at 416.

Figure 5:
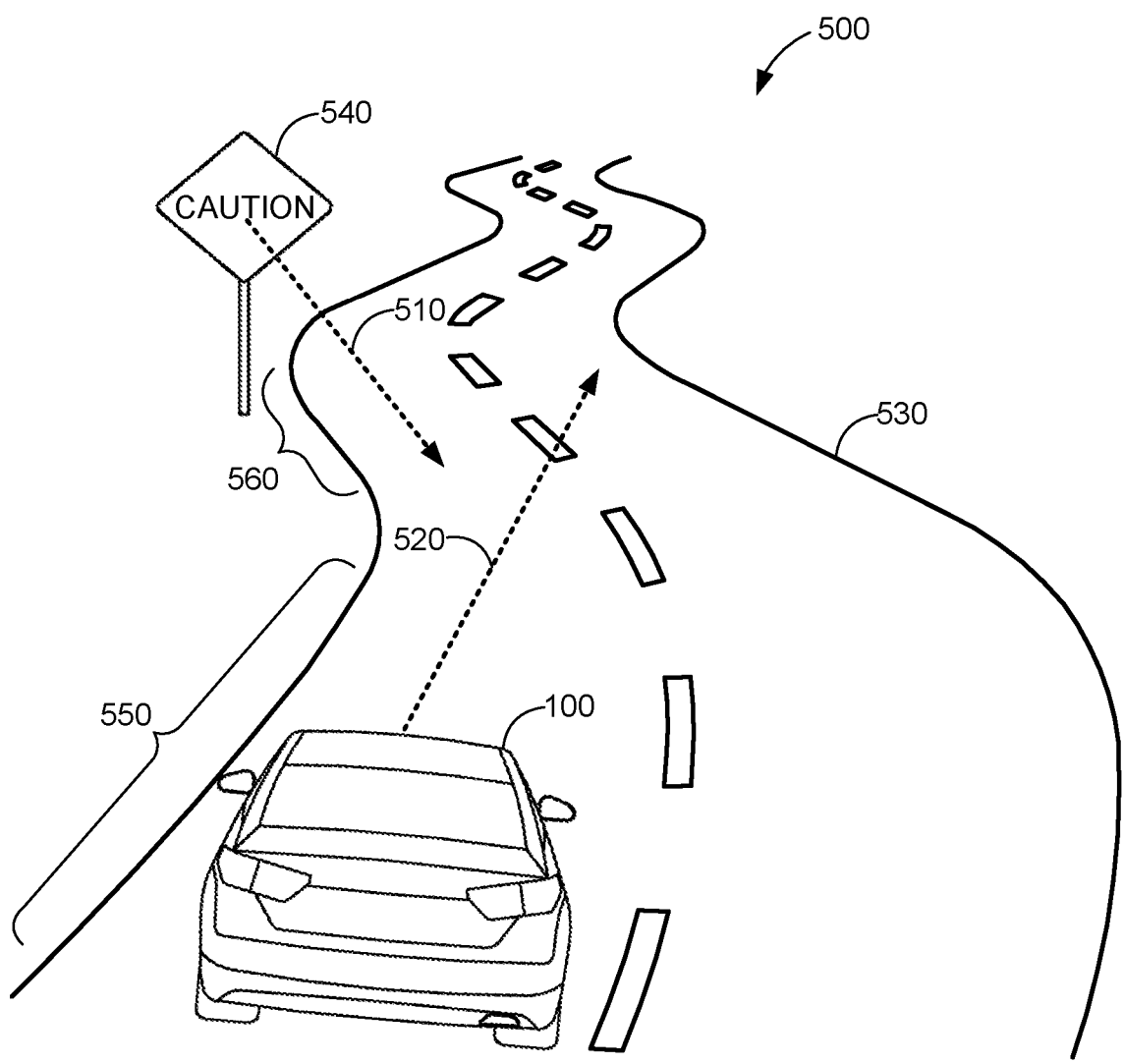
FIG. 5 shows an exemplary diagram illustrating a normal direction of a traffic sign and a translation direction of the vehicle traveling on a road, according to one embodiment of the present disclosure.

FIG. 5 shows an exemplary diagram 500 illustrating a normal direction 510 of a traffic sign 540 and a translation direction 520 of the vehicle 100 traveling on a road 530, according to one embodiment of the present disclosure. As shown, the vehicle 100 may be traveling on the road 530 toward a translation direction 520 and at a specified speed, which may be provided to the rotation determination unit 242 from the vehicle electronic system 280. In this case, the translation of the vehicle 520 may be defined as a translation vector $t_v$, which may include the direction 520 and the speed of the vehicle at a particular time. As the vehicle 100 travels along the road 530, the vehicle 100 will generally travel according to the shape of the road 530. For example, the translation or the translation vector $t_v$ of the vehicle 100 may be parallel to the direction of the road 530 for some period of time when a portion 550 of the road 530 is relatively straight and may vary when the road 530 is curved. Thus, the translation or the translation vector $t_v$ of the vehicle 100 may change according to the direction that the vehicle 100 is traveling on the road 530.

In the illustrated diagram 500, the traffic sign 540 is located ahead of the vehicle 100 at a side of a portion 560 of the road 530. The normal direction 510 of the traffic sign 540 is perpendicular to the surface of the traffic sign 540 and a normal vector n for the normal direction 510 may be determined from at least one image of the road 530 including the traffic sign 540. In one embodiment, it may be assumed that traffic signs are generally arranged along a road such that the surface of the signs are parallel to the direction of the road. Thus, the normal direction 510 of the traffic sign 540 may be assumed or approximated as being parallel to the direction of the road 530. In this case, the direction of the portion 560 of the road 140 on which the traffic sign 540 is located may be determined from one or more images captured by an image sensor 120. The direction of the portion 560 of the road 140 may then be used as the normal direction of the traffic sign 540.

Figure 6:
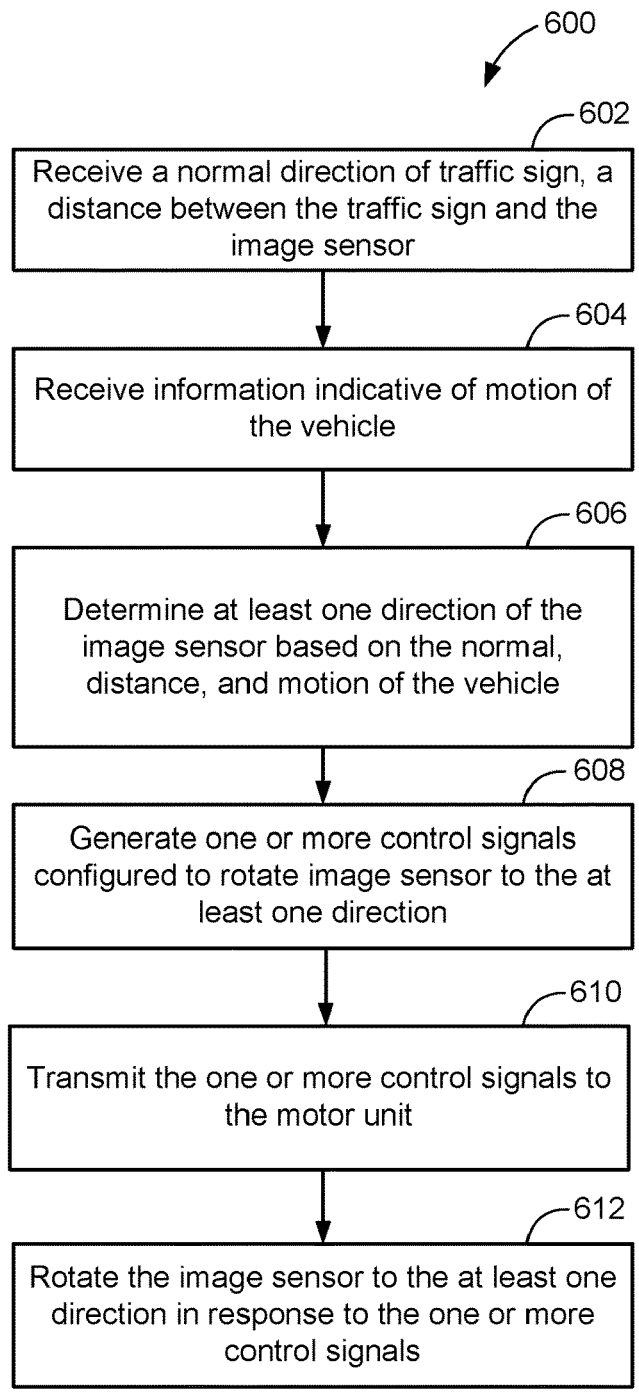
FIG. 6 illustrates a flow chart of a method to determine at least one direction of rotation of the image sensor, according to one embodiment of the present disclosure.

FIG. 6 illustrates a flow chart of a method 600 performed by the image sensor adjusting unit 240 of the electronic device 110 to determine at least one direction of rotation of the image sensor 120, according to one embodiment of the present disclosure. In the image sensor adjusting unit 240, the rotation determination unit 242 may receive, at 602, a normal direction 150 of the traffic sign 130 and a distance D1 between the traffic sign 130 and the image sensor 120 at time T1. Additionally, the rotation determination unit 242 may receive information indicative of motion of the vehicle at 604 such as a speed, a translation vector $t_v$ indicative of a direction of the vehicle at T1, and the like. At 606, the rotation determination unit 242 may determine at least one direction to which the image sensor 120 is to be adjusted based on the normal direction, the distance, and the information indicative of motion of the vehicle. The at least one direction may be determined as a single direction defined by a three-dimensional (3D) coordinate system (e.g., an x, y, and z coordinate system, a spherical coordinate system, or the like) or as one or more directions or angles of rotation about the x, y, and z axis (e.g., yaw, pitch, and roll). In one embodiment, the at least one direction may be determined to include at least one direction among x, y, and z directions, which may be defined by a direction vector having at least one component among x, y, and z components, or at least one rotation angle or degree among α (e.g., yaw), β (e.g., pitch), and γ (e.g., roll) in a 3D coordinate system.

In one embodiment, the rotation determination unit 242 may determine the at least one direction of rotation for the image sensor 120 based on the following two-view geometry or homography equation:

$$x'=KHK^{-1}x=K(R-tn^T/d)K^{-1}x \qquad \text{Equation (1)}$$

where x' indicates an estimated or predicted position of a target (e.g., the traffic sign 130), x indicates a current position of the target based on a captured image, K indicates a matrix (e.g., a 3×3 matrix) indicative of internal parameters of the image sensor 120, H indicates a transformation matrix (e.g., a 3×3 matrix) of the target in the captured image, R indicates a total image sensor rotation (which accounts for rotation caused by the moving vehicle 100 and motion of the image sensor 120), t is a matrix (e.g., a 3×1 matrix) indicating a total image sensor translation (which accounts for translation caused by the moving vehicle 100 and the motion of the image sensor 120), d indicates a distance between the image sensor 120 and the target, and n indicates a normal direction of the target.

In order to reduce or minimize blurring in one or more subsequent images to be captured, the image sensor 120 needs to be rotated to compensate for the motion of the vehicle 100 relative the traffic sign 130. In one embodiment, the motion of the vehicle relative to the traffic sign 130 may be minimized by assuming that x=x'. Based on this relationship, the transformation matrix H may be expressed as follows:

$$H=(R-tn^T/d)=I \qquad \text{Equation (2)}$$

where I is an identity matrix (e.g., a 3×3 matrix). Since the total motion (e.g., movement) of the image sensor 120 in the vehicle 100 may include translation and rotation components, the total translation and rotation motion of the image sensor 120 may be a sum of the translation and rotation motions of the vehicle 100 and the image sensor 120. Accordingly, the total motion of the image sensor 120 may be expressed as follows:

$$\begin{bmatrix} R & t \\ 0 & 1 \end{bmatrix} = \begin{bmatrix} Rv & tv \\ 0 & 1 \end{bmatrix} \begin{bmatrix} Rc & tc \\ 0 & 1 \end{bmatrix} \quad \text{Equation (3)}$$

where $R_v$ indicates a rotation of the vehicle 100, $t_v$ indicates a translation of the vehicle 100, $R_c$ indicates a rotation of the image sensor 120, and $t_c$ indicates a translation of the image sensor 120.

From Equation 3 above, the total rotation R of the image sensor 120 may be expressed as $R=R_v R_c$. In addition, the total translation t of the image sensor 120 may be expressed as $t=R_v t_c + t_v$. In some embodiments, the translation $t_c$ of the image sensor 120 may be significantly smaller or negligible (i.e., $t \gg t_v$) compared to the translation $t_v$ of the vehicle 100. Accordingly, the total translation t of the image sensor 120 may be determined to be the translation $t_c$ of the vehicle 100 ($t \approx t_c$). By substituting R in Equation 2 with $R_v R_c$ and substituting t in Equation 2 with $t_v$, the rotation $R_c$, to which the image sensor 120 is to be adjusted, may then be expressed as follows:

$$R_c = R_v^{-1} \{I - (t_v n^T)(|T_v|d)\} \quad \text{Equation (4)}$$

Using Equation 4, the rotation determination unit 242 may determine the at least one rotation direction $R_c$ for the image sensor 120 based on $R_v$ and $t_v$, which are received from the vehicle electronic system 280, a normal direction n, which is received from the normal determination unit 228, and a distance d, which may be received from the distance determination unit 226 and/or the distance sensor 282.

In an additional or alternative embodiment, the rotation determination unit 242 may determine the at least one direction by decomposing and expressing the rotation matrix $R_c$ in terms of a diagonal matrix $\Sigma$ and unitary matrices U and V by applying a suitable decomposition method such as a singular value decomposition (SVD) method, or the like. Upon applying the SVD method, the rotation matrix $R_c$ may be decomposed or expressed as follows:

$$R_c = U\Sigma V^T \quad \text{Equation (5)}$$

where U indicates an m×m real or complex unitary matrix, $\Sigma$ indicates an m×n rectangular diagonal matrix, and V indicates an n×n real or complex unitary matrix. Then from Equation 5, a rotation matrix $R_c^*$, which may be a conjugate transpose of the matrix $R_c$ or a transpose of the complex conjugate of the matrix $R_c$, may be obtained according to the following relationship: $R_c^* = VU^T$. The rotation determination unit 242 may then determine the at least one direction of rotation for the image sensor 120 based on the elements of the rotation matrix $R_c^*$. In some embodiments, the rotation matrix $R_c^*$ may also be used in determining the at least one direction of the image sensor 120 in cases where the relationship x=x' for Equation 1 above may not be satisfied. For example, when the vehicle 100 travels a significant distance between the time an image (e.g., the image 160) is captured and the time a next image (e.g., the image 170) is captured, the rotation matrix $R_c$ may not be a sufficiently accurate 3D rotation matrix and may not be in an orthonormal relationship (e.g., $R^T = R^{-1}$ and det(R)=1). Thus, the rotation matrix $R_c^*$ may be used in determining the at least one direction of the image sensor 120.

In another embodiment, the rotation determination unit 242 may determine the at least one direction of the image sensor 120 based on at least one angle between a normal direction vector n of the traffic sign 130 and a translation vector $t_v$ of the vehicle 100. For example, an angle θ between the normal direction vector n and the translation vector $t_v$ may be calculated by determining a reference or originating point of the vector n and vector $t_v$ in a 3D coordinate system. In this case, a center point in the traffic sign 130 in the image 160 of the road 140 may be selected as the reference point of the normal vector n. Similarly, a coordinate corresponding to a position of the image sensor 120 may be used as a reference or originating point of the translation vector $t_v$. From one or more images of the road 140 including the traffic sign 130, a location (e.g., a coordinate) and a height of the traffic sign may be determined. The at least one direction of the image sensor 120 may then be determined based on the location and height of the traffic sign and the normal and translation vectors with reference points in the 3D coordinate system.

With reference to FIG. 6, the motor control unit 244 may, at 608, receive the at least one direction of the image sensor 120 from the rotation determination unit 242 and generate one or more control signals configured to rotate the image sensor 120 to the at least one direction. The at least one direction received from the rotation determination unit 242 may indicate at least one direction x, y, or z, which may be defined by a direction vector having at least one component among x, y, and z components, or at least one rotation angle or degree such as α (e.g., yaw), β (e.g., pitch), or γ (e.g., roll) in a 3D coordinate system. In one embodiment, the motor control unit 244 may generate one or more control signals adapted to drive the motor unit 250 to rotate the image sensor 120 to the at least one direction among x, y, and z directions or by at least one rotation angle or degree among yaw, pitch, and roll. At 610, the motor control unit 244 may then transmit the one or more control signals to the motor unit 250.

In response to receiving the one or more control signals, the motor unit 250 may rotate the image sensor 120 to the at least one direction at 612. The motor unit 250 may include one or more motors configured to rotate the image sensor 120 in the at least one direction. In one embodiment, the motor unit 250 may be configured to rotate the image sensor 120 in one or more directions among x, y, and z directions corresponding to a direction vector having x, y, and z components. Alternatively, the motor unit 250 may be configured to rotate the image sensor 120 by at least one rotation angle or degree among α, β, and γ with respect to x, y, and z-axis, respectively.

Figure 7:
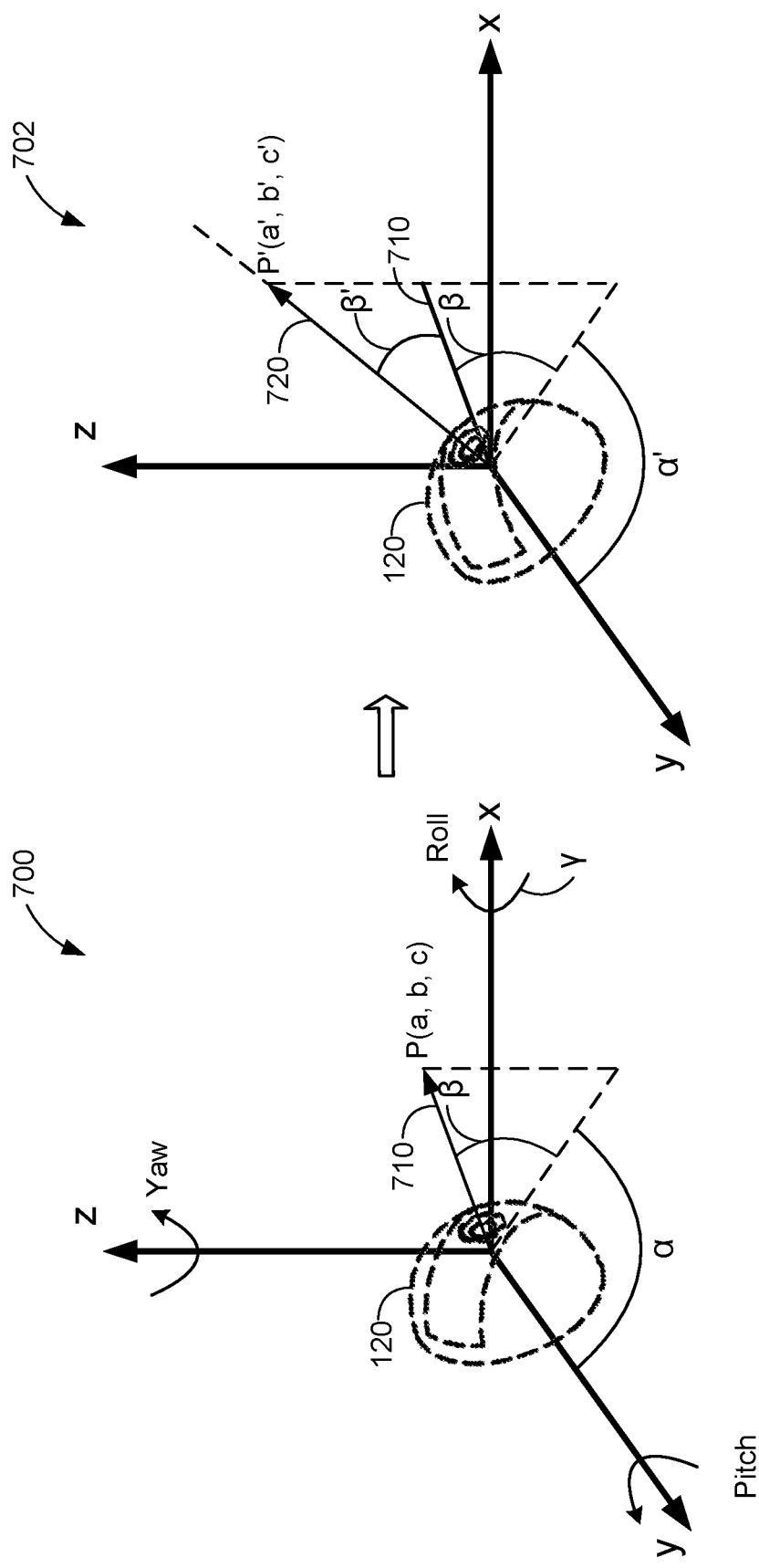
FIG. 7 shows adjusting the image sensor from a first direction in a 3D coordinate diagram to a second direction in the coordinate diagram, according to one embodiment of the present disclosure.

FIG. 7 shows adjusting the image sensor 120 from a first direction 710 in a 3D coordinate diagram 700 to a second direction 720 in the coordinate diagram 702, according to one embodiment of the present disclosure. In the 3D coordinate diagram 700, the first direction 710 may represent a direction of the image sensor 120 (e.g., a view direction of the image sensor 120) when an image of a road is captured. The second direction 720 in the 3D coordinate diagram 702 may represent a direction to which the image sensor is rotated for capturing one or more next images.

The 3D coordinate diagrams 700 and 702 may include x, y, and z axis and rotation around the x-axis, y-axis, and z-axis may represent pitch, roll, and yaw, respectively. A position of the image sensor 120 may be at the origin (0, 0, 0) in the 3D coordinate diagram. In one embodiment, the direction 710 may be described or represented as a vector from the origin to a point P defined by (a, b, c). Additionally or alternatively, the direction 710 may be described or represented by angles α and β, which may correspond to yaw and pitch, respectively. In the illustrated embodiment, a change in the angle α (e.g., yaw) may indicate adjusting or rotating the image sensor 120 about the z-axis such that the image sensor 120 may rotate side to side. Similarly, a change in the angle β (e.g., pitch) may indicate adjusting or rotating the image sensor 120 about the y-axis such that the image sensor 120 may rotate up or down.

The image sensor 120 may then be adjusted to the direction 720 in the coordinate diagram 702. In this case, the direction 720 may be described or represented as a vector from the origin to a point P' defined by (a', b', c'). Additionally or alternatively, the direction 720 may be described or represented by angles α' and β', which may correspond to yaw and pitch, respectively. In the illustrated embodiment, a change from the first direction 710 to the second direction 720 may be in the z-axis from c to c' or from angle β to angle β' so that the image sensor 120 rotates upward to the direction 720 without rotation in other directions (e.g., α=α', a=a', and b=b'). Although the image sensor 120 is described as changing from the direction 710 to the direction 720, it may be adjusted in any suitable directions or angles.

Figure 8:
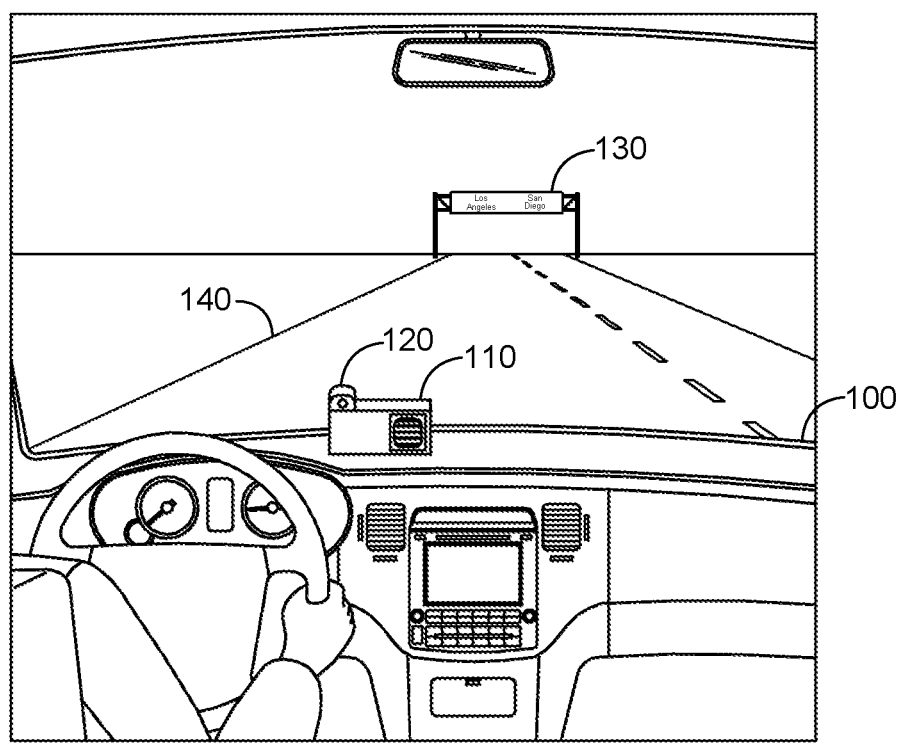
FIG. 8 illustrates an exemplary diagram of the vehicle equipped with the electronic device traveling on the road toward the traffic sign, according to one embodiment of the present disclosure.

FIG. 8 illustrates an exemplary diagram of the vehicle 100 equipped with the electronic device 110 traveling on the road 140 toward the traffic sign 130, according to one embodiment of the present disclosure. The image sensor 120 in the electronic device 110 may capture an image (e.g., an image 160) including the road 140 and the traffic sign 130. Upon capturing the image, the electronic device 110 may detect the traffic sign 130 in the image and determine a distance between the traffic sign 130 and the image sensor 120 based on distance information that may be received from the distance sensor 282. Additionally, the electronic device 110 may determine a normal direction of the traffic sign 130 based on the captured image 160, and receive information indicative of motion of the vehicle 100 from the vehicle electronic system 280. The electronic device 110 may then determine at least one direction to which the image sensor 120 is to be adjusted based on the distance, the normal direction, and the information indicative of the motion of the vehicle 100, and adjust the image sensor 120 to the at least one direction. As the image sensor 120 is being adjusted or when the image sensor 120 has been adjusted to the at least one direction, the electronic device 110 may control the image sensor 120 to capture one or more images of the road 140. Thus, the electronic device 110 may reduce or minimize blurring of the traffic sign 130 in the images captured by adjusting the image sensor 120.

The electronic device 110 may determine a distance from the vehicle 100 to the traffic sign 130 and/or a normal direction of the traffic sign based on at least one image. According to one embodiment, the image sensor 120 may be a stereoscopic image sensor or may include a plurality of image sensors or lenses. In the case of a stereoscopic sensor, two or more images of the road 140 including the traffic sign 130 may be captured simultaneously and combined into a single image from which the electronic device 110 may determine the distance and the normal direction. In the case of multiple image sensors or lenses, two or more images of the road 140 including the traffic sign 130 may be captured at different times and the electronic device 110 may determine one or more distances and a normal direction from the images.

Figure 9:
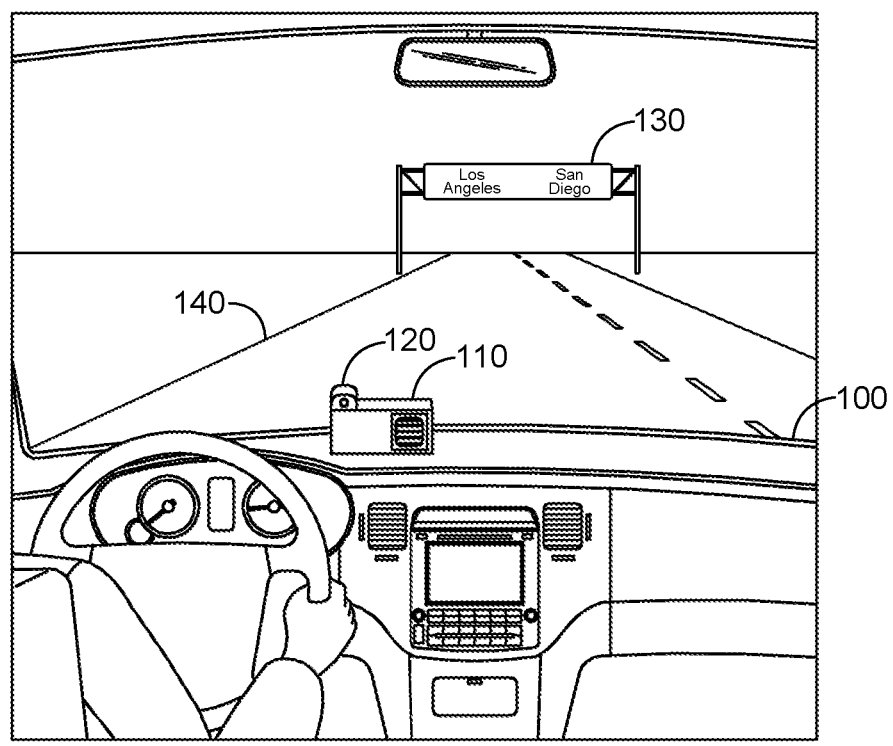
FIG. 9 illustrates an exemplary diagram of the vehicle in which the electronic device may capture the second image as the vehicle may have traveled closer to the traffic sign since capturing the first image, according to one embodiment of the present disclosure.

According to another embodiment, the image sensor 120 may not be a stereoscopic image sensor or may not include a plurality of image sensors or lenses. In this case, the electronic device 110 may capture a plurality of images of the road 140 including the traffic sign 130 via the image sensor 120. For example, the electronic device 110 may capture a first image (e.g., the image 160) of the road 140 including the traffic sign 130 as described with reference to FIG. 8 above and then a second image of the road 140 including the traffic sign 130. FIG. 9 illustrates an exemplary diagram of the vehicle 100 in which the electronic device 110 captures the second image as the vehicle 100 may have traveled closer to the traffic sign 130 since capturing the first image, according to one embodiment of the present disclosure. Based on the first and second images, the electronic device 110 may determine a distance from the vehicle 100 to the traffic sign 130, a normal direction of the traffic sign 130, and/or a position and height of the traffic sign 130.

Figure 10:
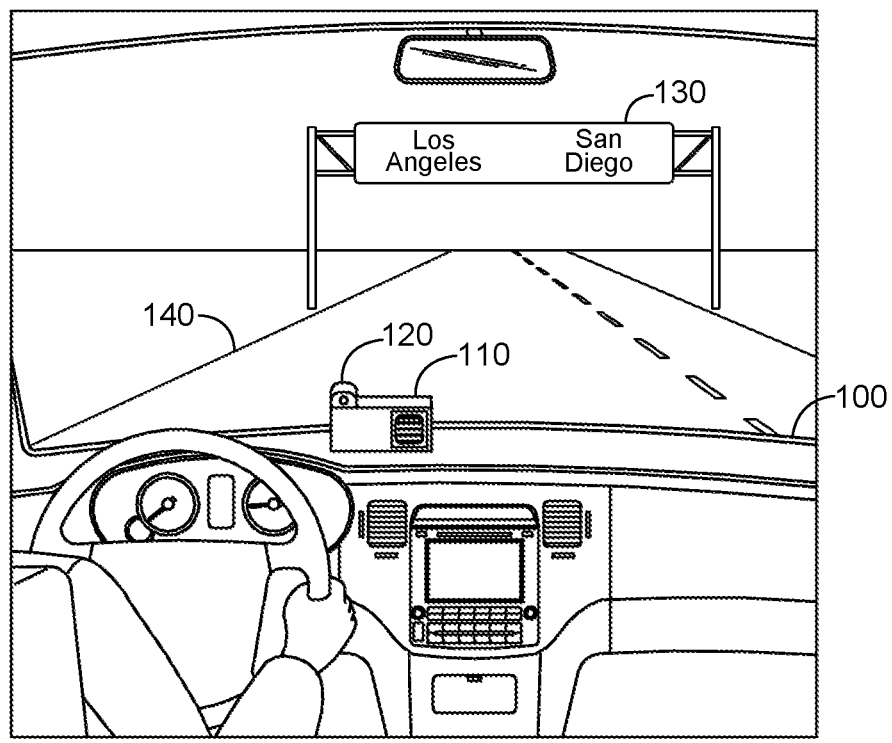
FIG. 10 illustrates an exemplary diagram of the vehicle in which the electronic device may capture one or more images of the road including the traffic sign as the vehicle moves further toward the traffic sign upon adjusting the image sensor to the at least one direction, according to one embodiment of the present disclosure.

Based on the normal direction, information indicative of the motion of the vehicle 100, at least one of the distances obtained from the first and second images, the electronic device 110 may determine at least one direction to which the image sensor 120 is to be adjusted. As the image sensor 120 is adjusted or upon adjusting the image sensor 120 to the at least one direction, the electronic device 110 may control the image sensor 120 to capture one or more images of the road 140 including the traffic sign. FIG. 10 illustrates an exemplary diagram of the vehicle 100 in which the electronic device 110 may capture one or more images of the road 140 including the traffic sign 130 as the vehicle 100 moves further toward the traffic sign 130 upon adjusting the image sensor 120 to the at least one direction, according to one embodiment of the present disclosure. As a result of the adjustment to the direction of the image sensor 120, blurring of the traffic sign 130 in the images captured by the image sensor 120 may be significantly reduced or minimized.

Figure 11:
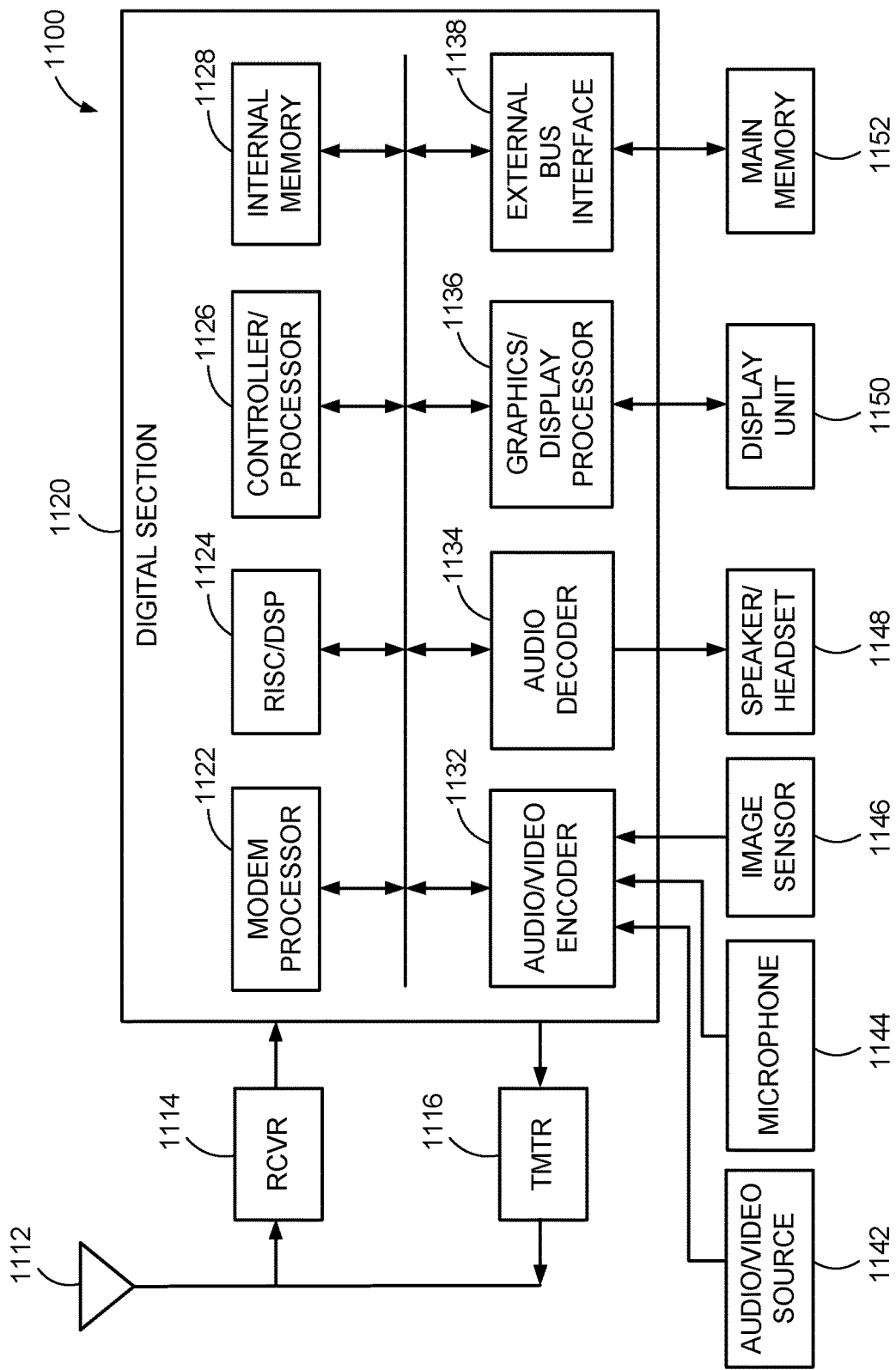
FIG. 11 illustrates a block diagram of an exemplary electronic device in which the methods and apparatus for adjusting an image sensor for capturing an image of a traffic sign may be implemented, according to one embodiment of the present disclosure.

FIG. 11 illustrates a block diagram of an exemplary electronic device 1100 in which the methods and apparatus for adjusting an image sensor for capturing an image of a traffic sign may be implemented, according to one embodiment of the present disclosure. The electronic device 1100 may be any suitable device equipped with an image capturing and processing capabilities and may be a dash cam, a black box, a smartphone, a tablet computer, a personal computer, a notebook computer, a navigation device, or the like with an image sensor capable of being mounted in or on a vehicle. The wireless communication system may be a CDMA system, a GSM system, a W-CDMA system, a LTE system, a LTE Advanced system, a Wi-Fi system and so on.

The electronic device 1100 may be capable of providing bidirectional communication via a receive path and a transmit path. On the receive path, signals transmitted by base stations may be received by an antenna 1112 and may be provided to a receiver (RCVR) 1114. The receiver 1114 may condition and digitize the received signal, and provide the conditioned and digitized digital signal to a digital section for further processing. On the transmit path, a transmitter (TMTR) 1116 may receive data to be transmitted from a digital section 1120, process and condition the data, and generate a modulated signal, which is transmitted via the antenna 1112 to the base stations. The receiver 1114 and the transmitter 1116 may be part of a transceiver that may support CDMA, GSM, W-CDMA, LTE, LTE Advanced, Wi-Fi and so on.

The digital section 1120 may include various processing, interface, and memory units such as, for example, a modem processor 1122, a reduced instruction set computer/digital signal processor (RISC/DSP) 1124, a controller/processor 1126, an internal memory 1128, a generalized audio/video encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the electronic device 1100. The controller/processor 1126 may perform the operation of various processing and interface units within the digital section 1120. The internal memory 1128 may store data and/or instructions for various units within the digital section 1120.

The generalized audio/video encoder 1132 may perform encoding for input signals from an audio/video source 1142, a microphone 1144, an image sensor 1146, etc. The generalized audio decoder 1134 may perform decoding for coded audio data and may provide output signals to a speaker/headset 1148. The graphics/display processor 1136 may perform processing for graphics, videos, images, and texts, which may be presented to a display unit 1150. The EBI 1138 may facilitate transfer of data between the digital section 1120 and a main memory 1152.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored at a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable a person skilled in the art to make or use the disclosure. Various modifications to the disclosure will be readily apparent to those skilled in the art, and the generic principles defined herein are applied to other variations without departing from the scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

ASPECTS OF THE PRESENT DISCLOSURE

Hereinafter, some aspects of the present disclosure will be additionally stated.

Example 1

According to an aspect of the present disclosure, there is provided a method for capturing an image of a traffic sign by an image sensor, including: capturing, by the image sensor, at least one image including the traffic sign, wherein the image sensor is mounted in a vehicle; detecting, by a processor, the traffic sign in the at least one image; in response to detecting the traffic sign, determining, by the processor, at least one direction of the image sensor based on the at least one image and motion of the vehicle; and adjusting, by the processor, the image sensor to the at least one direction.

Example 2

In the method of Example 1, further including: in response to adjusting the image sensor, capturing, by the image sensor, at least one or more next images including the traffic sign.

Example 3

In the method of any one of Examples 1 or 2, wherein adjusting the image sensor comprises adjusting at least one among yaw, pitch, and roll of the image sensor based on the at least one direction.

Example 4

In the method of any one of Examples 1 to 3, wherein determining at least one direction of the image sensor comprises determining the at least one direction of the image sensor adapted to track the traffic sign.

Example 5

In the method of any one of Examples 1 to 4, wherein determining at least one direction of the image sensor includes: determining a normal direction of the traffic sign based on the at least one image; determining a distance between the traffic sign and the image sensor; and determining the at least one direction of the image sensor based on the normal direction, the distance, and the motion of the vehicle.

Example 6

In the method of any one of Examples 1 to 5, wherein determining the distance between the traffic sign and the image sensor comprises determining the distance based on the at least one image or distance information from a distance sensor.

Example 7

In the method of any one of Examples 1 to 6, wherein determining the normal direction of the traffic sign comprises determining a direction of a road in the at least one image as the normal direction.

Example 8

In the method of any one of Examples 1 to 7, wherein the motion of the vehicle is indicative of information including at least one of displacement, elevation, speed, direction, or acceleration of the vehicle.

Example 9

In the method of any one of Examples 1 to 8, wherein detecting the traffic sign in the at least one image is based on at least one of a color, a shape, or a location of the traffic sign.

Example 10

In the method of any one of Examples 1 to 9, wherein adjusting the image sensor includes: generating, by the processor, at least one control signal configured to rotate the image sensor to the at least one direction; and rotating, by at least one motor unit, the image sensor to the at least one direction in response to the at least one control signal to reduce motion blur associated with the motion of the vehicle relative to the traffic sign.

Example 11

According to another aspect of the present disclosure, there is provided an electronic device for capturing an image of a traffic sign, including: an image sensor configured to capture at least one image including the traffic sign; a traffic sign detection unit configured to detect the traffic sign in the at least one image; a rotation determination unit configured to determine, in response to detecting the traffic sign, at least one direction of the image sensor based on the at least one image and motion of the vehicle; and a motor control unit configured to adjust the image sensor to the at least one direction.

Example 12

In the electronic device of Example 11, wherein the image sensor is further configured to capture one or more next images including the traffic sign in response to determining the at least one direction.

Example 13

In the electronic device of Example 11 or 12, wherein the at least one direction comprises at least one among yaw, pitch, and roll of the image sensor.

Example 14

In the electronic device of Examples 11 to 13, wherein the rotation determination unit is configured to determine the at least one direction of the image sensor adapted to track the traffic sign.

Example 15

In the electronic device of Examples 11 to 14, further including: a normal determination unit configured to determine a normal direction of the traffic sign based on the at least one image; and a distance determination unit configured to determine a distance between the traffic sign and the image sensor, wherein the rotation determination unit is configured to determine the at least one direction of the image sensor based on the normal direction, the distance, and the motion of the vehicle.

Example 16

In the electronic device of Examples 11 to 15, wherein the distance determination unit is configured to determine the distance between the traffic sign and the image sensor based on the at least one image or distance information from a distance sensor.

Example 17

In the electronic device of Examples 11 to 16, wherein the normal determination unit is configured to determine a direction of a road in the at least one image as the normal direction.

Example 18

In the electronic device of Examples 11 to 17, wherein the motion of the vehicle is indicative of information including at least one of displacement, elevation, speed, direction, or acceleration of the vehicle.

Example 19

In the electronic device of Examples 11 to 18, wherein the traffic sign detection unit is configured to detect the traffic sign based on at least one of a color, a shape, or a location of the traffic sign in the at least one image.

Example 20

In the electronic device of Examples 11 to 19, further including at least one motor unit configured to rotate the image sensor, wherein the motor control unit is further configured to generate at least one control signal adapted to rotate the image sensor to the at least one direction, and wherein the at least one motor unit is configured to rotate the image sensor to the at least one direction in response to the at least one control signal to reduce motion blur associated with the motion of the vehicle relative to the traffic sign.

Example 21

According to yet another aspect of the present disclosure, there is provided a non-transitory computer-readable storage medium including instructions causing at least one processor of an electronic device to perform operations of: capturing, by the image sensor, at least one image including the traffic sign, wherein the image sensor is mounted in a vehicle; detecting, by the processor, the traffic sign in the at least one image; in response to detecting the traffic sign, determining, by the processor, at least one direction of the image sensor based on the at least one image and motion of the vehicle; and adjusting, by the processor, the image sensor to the at least one direction.

Example 22

In the non-transitory computer-readable storage medium of Example 21, further including instructions that cause the at least one processor to: in response to adjusting the image sensor, capturing, by the image sensor, at least one or more next images including the traffic sign.

Example 23

In the non-transitory computer-readable storage medium of Examples 21 or 22, wherein adjusting the image sensor comprises adjusting at least one among yaw, pitch, and roll of the image sensor based on the at least one direction.

Example 24

In the non-transitory computer-readable storage medium of Examples 21 to 23, wherein determining at least one direction of the image sensor includes determining the at least one direction of the image sensor adapted to track the traffic sign.

Example 25

In the non-transitory computer-readable storage medium of Examples 21 to 24, wherein determining at least one direction of the image sensor includes: determining a normal direction of the traffic sign based on the at least one image; determining a distance between the traffic sign and the image sensor; and determining the at least one direction of the image sensor based on the normal direction, the distance, and the motion of the vehicle.

Example 26

In the non-transitory computer-readable storage medium of Examples 21 to 25, wherein determining the distance between the traffic sign and the image sensor comprises determining the distance based on the at least one image or distance information from a distance sensor.

Example 27

In the non-transitory computer-readable storage medium of Examples 21 to 26, wherein determining the normal direction of the traffic sign comprises determining a direction of a road in the at least one image as the normal direction.

Example 28

In the non-transitory computer-readable storage medium of Examples 21 to 27, wherein the motion of the vehicle is indicative of information including at least one of displacement, elevation, speed, direction, or acceleration of the vehicle.

Example 29

In the non-transitory computer-readable storage medium of Examples 21 to 28, wherein detecting the traffic sign in the at least one image is based on at least one of a color, a shape, or a location of the traffic sign.

Example 30

In the non-transitory computer-readable storage medium of Examples 21 to 29, wherein adjusting the image sensor includes: generating, by the processor, at least one control signal configured to rotate the image sensor to the at least one direction; and rotating, by at least one motor unit, the image sensor to the at least one direction in response to the at least one control signal to reduce motion blur associated with the motion of the vehicle relative to the traffic sign.

What is claimed:
1. A method for capturing an image of a traffic sign by an image sensor, comprising:
   capturing, by the image sensor, at least one image comprising the traffic sign, wherein the image sensor is mounted in a vehicle;

detecting, by a processor, the traffic sign in the at least one image;

in response to detecting the traffic sign, determining, by the processor, at least one direction of the image sensor based on a direction normal to a face of the traffic sign in the at least one image, a distance between the traffic sign and the image sensor, and motion of the vehicle; and adjusting, by the processor, the image sensor to the at least one direction based on the direction normal to the face of the traffic sign, the distance, and the motion of the vehicle, wherein adjusting the image sensor comprises adjusting at least one among yaw, pitch, and roll of the image sensor.

2. The method of claim 1, further comprising:

in response to adjusting the image sensor, capturing, by the image sensor, at least one or more images comprising the traffic sign.

3. The method of claim 1, further comprising adjusting the image sensor to one or more directions based on the motion of the vehicle.

4. The method of claim 1, wherein the image sensor tracks the traffic sign based on the at least one direction.

5. The method of claim 1, further comprising:

determining the direction normal to the face of the traffic sign based on the at least one image; and determining the distance between the traffic sign and the image sensor.

6. The method of claim 5, wherein the distance is determined based on the at least one image or distance information from a distance sensor.

7. The method of claim 5, wherein determining the direction normal to the face of the traffic sign comprises determining a direction of a road in the at least one image as the normal direction.

8. The method of claim 1, wherein the motion of the vehicle is indicative of information comprising at least one of displacement, elevation, speed, direction, or acceleration of the vehicle.

9. The method of claim 1, wherein detecting the traffic sign in the at least one image is based on at least one of a color, a shape, or a location of the traffic sign.

10. The method of claim 1, wherein adjusting the image sensor comprises:

generating, by the processor, at least one control signal configured to rotate the image sensor to the at least one direction; and rotating, by at least one motor unit, the image sensor to the at least one direction in response to the at least one control signal to reduce motion blur associated with the motion of the vehicle relative to the traffic sign.

11. An electronic device in a vehicle for capturing an image of a traffic sign, comprising:

an image sensor configured to capture at least one image comprising the traffic sign;

a traffic sign detection unit configured to detect the traffic sign in the at least one image;

a rotation determination unit configured to determine, in response to detecting the traffic sign, at least one direction of the image sensor based on a direction normal to a face of the traffic sign in the at least one image, a distance between the traffic sign and the image sensor, and motion of the vehicle; and a motor control unit configured to adjust the image sensor to the at least one direction based on the direction normal to the face of the traffic sign, the distance, and the motion of the vehicle, wherein adjusting the image sensor comprises adjusting at least one among yaw, pitch, and roll of the image sensor.

12. The electronic device of claim 11, wherein the image sensor is further configured to capture one or more images comprising the traffic sign in response to determining the at least one direction.

13. The electronic device of claim 11, wherein the motor control unit is further configured to adjust the image sensor to one or more directions based on the motion of the vehicle.

14. The electronic device of claim 11, wherein the image sensor is configured to track the traffic sign based on the at least one direction.

15. The electronic device of claim 11, further comprising:

a normal determination unit configured to determine the direction normal to the face of the traffic sign based on the at least one image; and a distance determination unit configured to determine the distance between the traffic sign and the image sensor.

16. The electronic device of claim 15, wherein the distance determination unit is configured to determine the distance based on the at least one image or distance information from a distance sensor.

17. The electronic device of claim 15, wherein the normal determination unit is configured to determine a direction of a road in the at least one image as the normal direction.

18. The electronic device of claim 11, wherein the motion of the vehicle is indicative of information comprising at least one of displacement, elevation, speed, direction, or acceleration of the vehicle.

19. The electronic device of claim 11, wherein the traffic sign detection unit is configured to detect the traffic sign based on at least one of a color, a shape, or a location of the traffic sign in the at least one image.

20. The electronic device of claim 11, further comprising at least one motor unit configured to rotate the image sensor, wherein the motor control unit is further configured to generate at least one control signal adapted to rotate the image sensor to the at least one direction, and wherein the at least one motor unit is configured to rotate the image sensor to the at least one direction in response to the at least one control signal to reduce motion blur associated with the motion of the vehicle relative to the traffic sign.

21. A non-transitory computer-readable storage medium comprising instructions causing at least one processor of an electronic device to perform operations of:

capturing, by an image sensor, at least one image comprising a traffic sign, wherein the image sensor is mounted in a vehicle;

detecting, by the at least one processor, the traffic sign in the at least one image;

in response to detecting the traffic sign, determining, by the at least one processor, at least one direction of the image sensor based on a direction normal to a face of the traffic sign in the at least one image, a distance between the traffic sign and the image sensor, and motion of the vehicle; and adjusting, by the at least one processor, the image sensor to the at least one direction based on the direction normal to the face of the traffic sign, the distance, and the motion of the vehicle, wherein adjusting the image sensor comprises adjusting at least one among yaw, pitch, and roll of the image sensor.

22. The non-transitory computer-readable storage medium of claim 21, further comprising instructions that cause the at least one processor to perform an operation of:

in response to adjusting the image sensor, capturing, by the image sensor, at least one or more images comprising the traffic sign.

23. The non-transitory computer-readable storage medium of claim 21, further comprising instructions that cause the at least one processor to perform an operation of adjusting the image sensor to one or more directions based on the motion of the vehicle.

24. The non-transitory computer-readable storage medium of claim 21, wherein determining the at least one direction enables the image sensor to track the traffic sign.

25. The non-transitory computer-readable storage medium of claim 21, further comprising instructions that cause the at least one processor to perforin an operation of determining the direction normal to the face of the traffic sign based on the at least one image and determining the distance between the traffic sign and the image sensor.

26. The non-transitory computer-readable storage medium of claim 25, wherein the distance is determined based on the at least one image or distance information from a distance sensor.

27. The non-transitory computer-readable storage medium of claim 25, wherein determining the direction normal to the face of the traffic sign comprises determining a direction of a road in the at least one image as the normal direction.

28. The non-transitory computer-readable storage medium of claim 21, wherein the motion of the vehicle is indicative of information comprising at least one of displacement, elevation, speed, direction, or acceleration of the vehicle.

29. The non-transitory computer-readable storage medium of claim 21, wherein detecting the traffic sign in the at least one image is based on at least one of a color, a shape, or a location of the traffic sign.

30. The non-transitory computer-readable storage medium of claim 21, wherein adjusting the image sensor comprises:
  generating, by the at least one processor, at least one control signal configured to rotate the image sensor to the at least one direction; and
  rotating, by at least one motor unit, the image sensor to the at least one direction in response to the at least one control signal to reduce motion blur associated with the motion of the vehicle relative to the traffic sign.

* * * * *